United States Patent [19]

Peters

[11] Patent Number: 5,094,056
[45] Date of Patent: Mar. 10, 1992

[54] ROOFING ATTACHMENT PLATE

[76] Inventor: William H. Peters, Rural Route 3, Bryan, Ohio 43506

[21] Appl. No.: 454,002

[22] Filed: Dec. 1, 1989

[51] Int. Cl.$^5$ .............................................. E04B 1/38
[52] U.S. Cl. ........................................ 52/410; 52/408; 52/512; 24/459
[58] Field of Search .................. 52/408, 409, 410, 506, 52/512; 24/459, 461, 462, 691

[56] References Cited

U.S. PATENT DOCUMENTS

| | | | |
|---|---|---|---|
| 4,502,256 | 3/1985 | Hahn | 52/512 |
| 4,651,490 | 3/1987 | Marston | 52/410 |
| 4,744,187 | 5/1988 | Tripp | 52/410 |
| 4,757,662 | 7/1988 | Gasser | 52/410 |
| 4,854,105 | 8/1989 | Delisle | 52/410 |

*Primary Examiner*—Michael Safavi
*Attorney, Agent, or Firm*—George R. Royer

[57] ABSTRACT

The subject invention is a roofing attachment plate with integrated means to seal and affix such plate on the upper part of a roof surface in order to secure a roof sheet to the upper surface of a roof. Specifically, the invention comprises a circular member or other shaped attachment plate which is adapted to be placed flush on the upper surface of the roof deck with opening means to receive a nail or stud to attach the plate to the roof structure, serving to anchor a roofing sheet to the fixed roof structure. The fastening plate has an upper cuplike chamber that is centrally located on the attachment plate and coaxially aligned with the central vertical axis of the fastening member, and such chamber has an outer circumferential surface, a portion of which has a circumferential recess to receive and hold a circular locking ring. The roofing sheet is placed over the top of the cup-like chamber and secured to the attachment plate by placing a cap-like member over the roofing sheet and over the cup-like chamber with a circular locking ring inserted in the cap to lock the rubber roofing sheet in place.

2 Claims, 1 Drawing Sheet

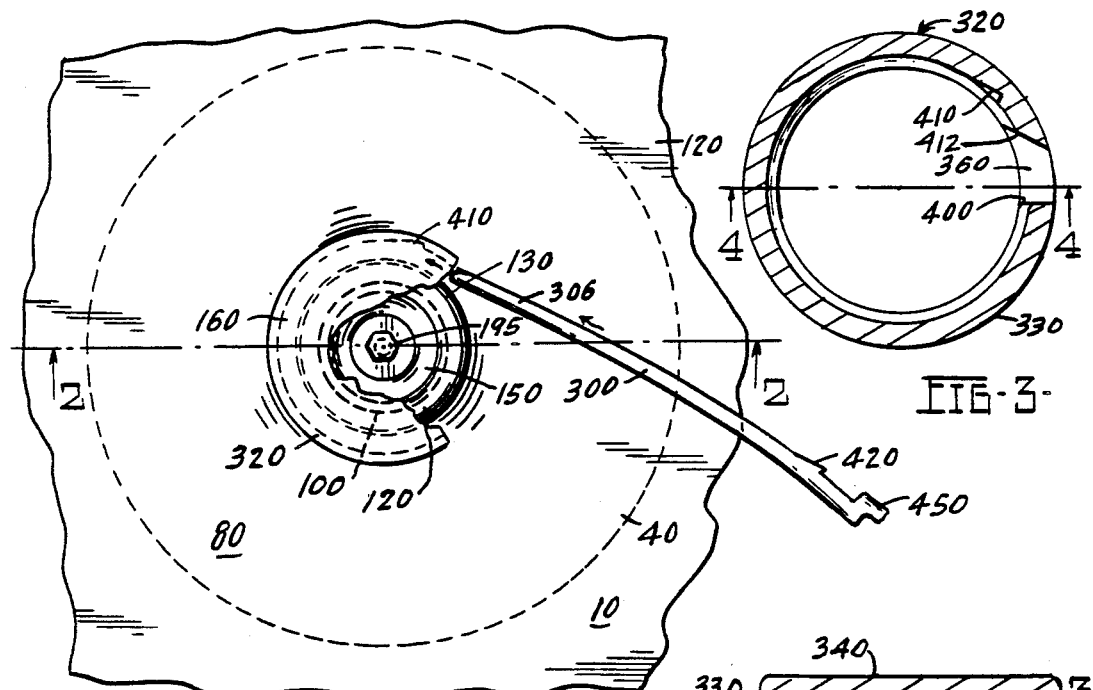
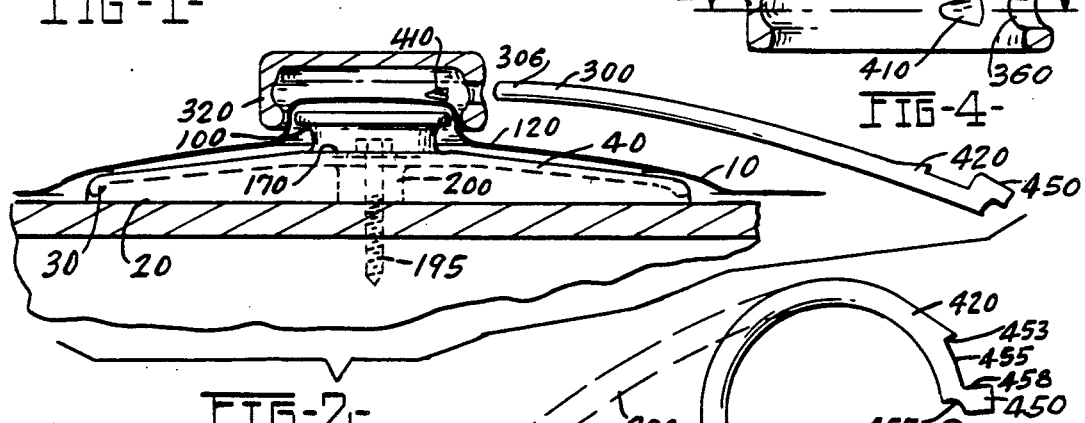
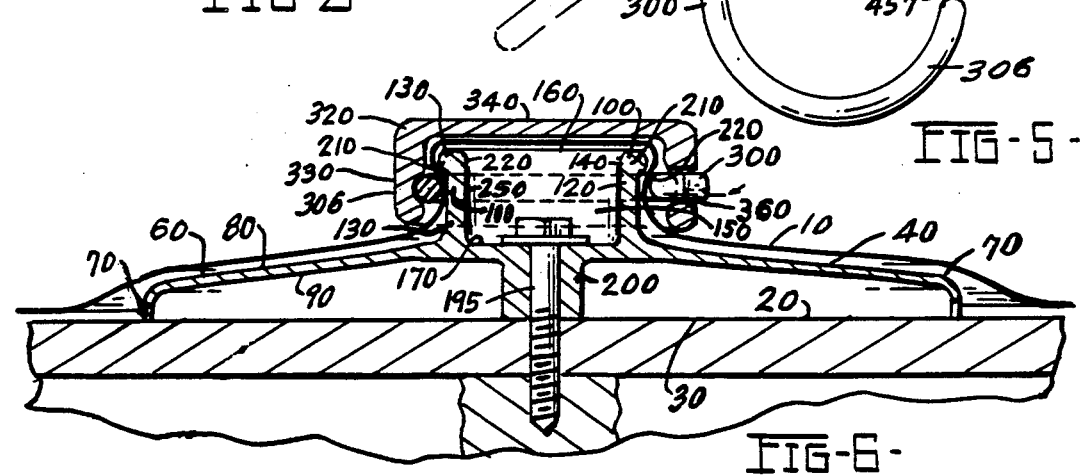

ROOFING ATTACHMENT PLATE

BACKGROUND OF INVENTION AND DESCRIPTION OF PRIOR ART

In many roofing applications, strategically placed bonding plates are affixed over the top of the roof sheets to attach the roof sheets over the upper roof surface. A conventional arrangement in utilizing such fastening plates involves a series of evenly-spaced rows and columns for such plates, regularly and symmetrically spaced. Such fastening plates function to securely hold the roofing sheets in place with the aid of a fastening device, such as a longitudinally extending screw-like or nail-like member forcibly thrust downwardly through the horizontally disposed fastening plate through the roof sheet material, and into the roof deck or fixed roof structure in order to affix the fastening plate and the roof sheet. Therefore, the existing practice, as stated is to affix the bonding plates over the upper roof surface, using nails or screws in order to firmly adhere the bonding plate against the upper surface of the roofing sheets.

One of the main problems encountered with the use of nails or screws or similar objects in attaching such bonding plates is that when they are inserted into the roof deck, they can generally cause distortion damage in the wood or other roof material immediately around the screw or nail. Such damage usually leaves gaps or spaces adjacent the screw or nails. This, in turn, yields weakness in the roof structure and also yields a potential source of roof leaks through the nail openings, thereby permitting water to flow into the roof infrastructure. Still another problem that is found in this respect is that at times when the nail or screw-like member is lodged through the roof structure at an angle from the vertical, the hole in the roof becomes uneven and the top plate does not rest securely and flush against the roof surface. As a result, air and water may penetrate through the roof at this juncture. Yet another problem encountered with the use of traditional or existing attachment plates is that they do not effectively seal the roofing sheet. More specifically, one of the major problems with the use of existing roof fasteners is that they do not effectively seal the roof structure against seepage of water and air, and therefore cause problems with the roof integrity. This invention is therefore directed to overcome the foregoing problems and the following objects are directed accordingly.

OBJECTS

In view of the above, it is an object of the subject invention to provide an improved device for attaching roofing sheets to the upper area of a roof;

Still another object of the invention is to provide a fastening device for attaching ruuber roof sheets for covering roof structure;

An object of the subject invention is to provide an improved securing apparatus for affixing roofing materials to a roof structure;

Yet another object of the subject invention is to provide an improved fastening device;

Another object of the invention herein is to provide an improved device for affixing roof sheets to the upper surface of a roof;

Yet another object is to provide a fastening device that is secured with a removable key;

Still another object of the device is to permit disassemble and reassemble without removing it from the roof structure;

Another object of the device is to attain all of the above without penetration of the rubber membrane;

Another object is to provide a key locking mechanism to prevent accidental disassembly;

Another object is to provide fast and simple application of roofing membrane;

Yet another object is to provide a device by which the roof membrane may be removed with only partial disassembly of the retaining device, thus avoiding cutting and patching the roof membrane for reattachment to the retaining device;

Another object of the device is a retaining key to provide frictional cooperation between roof membrane and cap to provide positive ingress and egress;

Another object of the device is a restrictive screw opening that allows ingress of the screw head during application and prevents egress during its funcitonal use;

Other and further objects will become apparent from a reading of the following description taken in conjunction with the claims and drawings.

DESCRIPTION OF DRAWINGS

FIG. 1 is a top elevational view of the device utilizing the invention herein, shown partically cut away.

FIG. 2 is a side elevational view, in cross section, of the device shown used in a roof structure;

FIG. 3 is a top elevational view, in section, of the cap-like device used in the subject invention.

FIG. 4 is a side elevational view of the cap device, in cross section, as used in the subject device;

FIG. 5 is a top elevational view of the locking ring used in the subject device;

FIG. 6 is a side elevational view of the subject device, in section.

DESCRIPTION OF GENERAL EMBODIMENT

The subject invention is a roofing attachment plate with integrated means to seal and affix such plate on the upper part of a roof surface in order to secure a roof sheet to the upper surface of a roof. Specifically, the invention comprises a circular member on other shaped attachment plate which is adapted to be placed flush on the upper surface of the roof deck with opening means to receive a nail or stud to attach the plate to the roof structure, serving to anchor a roofing sheet to the fixed roof structure. The fastening plate has an upper cup-like chamber that is centrally located on the attachment plate and coaxially aligned with the central vertical axis of the fastening member, and such chamber has an outer circumferential surface, a portion of which has a circumferential recess to receive and hold a circular locking ring. The roofing sheet is placed over the top of the cup-like chamber and secured to the attachment plate by placing a cap-like member over the roofing sheet and over the cup-like chamber with a circular locking ring inserted in the cap to lock the rubber roofing sheet in place.

DESCRIPTION OF PREFERRED EMBODIMENT

In describing the preferreed and other potential embodiments of the subject invention, it is to be stressed, at this juncture that the following descriptions are of only a few of the potential embodiments of the subject invention, and therefore such descriptions shall not be construed as limiting the scope of the invention.

The invention herein relates to an apparatus used for affixing roof sheets to the upper surface of a roof of any type. Further, the subject invention is most generally directed to roof structures wherein the roof is horizontal, however, it is not to be so limited. Also, while the following description is directed to a situation wherein the bonding plates are attached over top of the rubber roof sheets, this invention is also applicable to those circumstances where the fastening plates are placed between the upper roof surface and the lower surface of the roofing sheets. This invention is particularly adapted to this latter arrangement. However, it is to be noted that this invention is not limited soley to to the process of affixing rubber roof sheets to the upper deck of a roof and may be used in conjunction with other types of roof coverings.

Attention is now directed to the drawings in which a preferred embodiment of the subject invention is shown. The subject invention involves a device and method to aid in the affixing of roof sheets, such as roof sheet 10, a roof surface such as roof 20, shown in FIG. 2. In this respect, the roof 20 is shown as a horizontally disposed flat roof having perimeter edges not shown. Such roof 20 is considered generally conventional in this regard, however, the subject invention can apply to a roof of any configuration, irrespective whether it is rectangular, flat, or other structural shape.

In the process of affixing roof sheets to roof 10, such as rubber roofing sheets, the first step in the process is to lay a plurality of fastening plates such as plates of the type incorporating the subject invention, in a flat or flush manner to the upper surface 30 of the roof deck 20. The sheet 10 is disposed over the upper surface 30 of the roof 10 together with other roof sheets so that all such sheets cover the entire roof surface 30 in a flush manner. The next subsequent step involves placing rubber roof sheets over the top of the various fastening plates, such as plate 40, which may be positioned and affixed over the upper surface of the roof deck 20, as shown. Fastening plates, such as plate 40, are generally positioned and affixed in a series of evenly-spaced rows and columns, in a similar grid pattern over the upper roof surface 30, although this feature is not critical to the subject invention and the subject plate device may be affixed or applied in any regular or irregular pattern. The next subsequent step in the attachment processs after the rubber roof sheets are laid on top of the fastening plates is to affix a suitable fastening member to the rubber roofing sheet 10 to and through the fastening plate to roof 20. As discussed above, the horizontal fastening plate 40 is used as an intermediate holding member with the fastening device inserted through an appropriate vertical opening in such fastening plate 40 for such fastening procedure. In the embodiment shown in the drawings and described herein, the fastening plate 40 as shown incorporates features of the subject invention as more fully described below.

Certain roofing applications are better suited for screws as opposed to nails or other devices, as such fastening devices or other means as the fastening device to secure the rubber roof sheet 10 to the roof 20. In this latter regard, irrespective of whether the fastening member is a nail, spike, screw, or other similar longitudinally extending member, the fastening member is adapted to extend vertically downward through the rubber roof sheet 10 and roof 20, as shown, and through the bonding plate 40.

In describing the preferred embodiment of the subject device, it is to be stressed at this point that the description herein will be directed to an attachment plate 40, as shown in FIG. 1. However, it is to be noted that the subject invention may involve other variant forms and embodiments, and thus, while the specific description below is directed to the embodiment shown in the drawings, the scope of this invention is not so limited.

As shown in the drawings, the attachment plate 40 is shown as generally comprising in its basic structure, a plate component 60 generally circular configuration, as viewed from a top planar view as shown in FIG. 2, and as viewed from FIG. 6. The circular planar configuration for the flat plate component 60 is not critical, as such plate may be configured other than that of a circular member, or precisely as a flat plate member. Plate 60 is shown as preferably being of an inverted saucer shape. More specifically, plate member 60 has an external circumferential rim 70, and as shown in the drawings, and particularly FIG. 6, the plate 60 forming the main basic component of the attachment plate 40 is a circular disc member with an inverted saucer shape having an upper surface 80 and a lower surface 90. More particularly, plate 60 has a circumferential rim 70 and an upper surface 80 and a lower surface 90, with such surfaces being inclined upwardly towards the center of the plate 60 from its rim 70. As seen in FIG. 6, when the plate member 60 is placed with the lower surface 90 facing downwardly, the plate member 60 rests on circumferential rim 70 with the middle or central portions rising upwardly in slight V-shaped fashion, as seen in FIG. 6. By this constructional relationship when placed flush against a roof surface, the plate 60 will rest on the rim 70 with the remaining part of the lower surface 90 of the plate member 60 extending slightly above the roof deck 20 as shown in FIG. 6.

Integrally formed on the upper, central surface of such plate member is an upwardly protruding cup-like member 100. More particularly, the upwardly protruding cup member 100 is formed by an upwardly protruding circumferentially extending circular wall 120, which circular wall 120 has an outer circumferential surface 130 and an inner circumferential surface 140. The space inside the inner circumferential surface 130 forms an inner cup-like chamber 150 which has an opening 160 at the top and a bottom surface 170. Integrally formed into the bottom surface 170 of the cup-like chamber 150 is an opening 195 which extends vertically downwardly into a longitudinally extending, downwardly protruding finger-like extension 200 which protrudes vertically downwardly from the lower surface of such plate member 60, as seen in the drawings. This finger-like extension is shown as extending downwardly from the lower surface 90 of the plate member a distance equal to lower extent of the rim 70 so that the bottom surface of the finger-like extension contacts the upper surface of the roof deck 20 as seen in FIG. 6. In this positional relationship, a nail, screw, or other longitudinally extending fastening device is inserted through the opening 195 downwardly through the roof sheet 10 and roof structure 20.

Moreover, as seen in the drawings, the outer circumferential surface of the wall 120 of cup member 100 has a circumferentially disposed, radially outwardly protruding circumferential lip 210. Such lip 210 forms on its undersurface a circumferentially extending recess 220 in the outer circumferential surface of said wall as seen. Such recess 220 is adapted to receive circular locking pin 300 which fits between the cap 320 and cup 100, as more fully described below.

More specifically, the cap 320 is structured as a cylindrically-shaped cup member inverted with the open part facing downward to be inserted over the top of the cup member 100 as shown in FIG. 6, after the rubber roof membrane 10 is placed up and over the cup member 100, conformingly, the cap 320 has an outer circumferential wall 330 and solid upper surface 340. Integrally formed into the outer circumferential wall of the cap 320 is an opening port 360 which is adapted to receive locking pin 300. As seen from the upper cross-sectional elevational view of the cap 320 of FIG. 3, the opening port 360 has a flat forward or leading edge 400, which edge is aligned with a radius extending from the center of the cap 320, while the following or rear side wall 412 of the opening 360 is angled away from the leading edge 420. One of the rubber roof sheets 10 is placed over the top of cup 100 of the fastening plate cap 320 and is placed over the rubber sheet 10. Then the forward end 306 of the locking pin 300 is inserted through the port opening 360 and is pushed around the groove 220 until it fits circumferentially and completely around such groove 220 in a circumferentially conforming manner. Once the pin 300 is locked into this latter position, the cap 320 is rotated in a clockwise manner until this depresses the pin 320 against the rubber roof sheet 10, thereby locking the pin 300 in place against the rubber roof sheet 10, as shown in the drawings. This rotation also serves to frictionally lock the pin 300 in a static position. This locking occurs after the plate 40 has been affixed to the roof surface 20, thus integrally locking the roof sheet 10 through the fastening plate 40 to the roof.

More particularly, the locking pin 300 is an elongated member capable of being readily formed into a circular member, as shown in FIG. 5. The forward end 306 of the locking member 300 is somewhat rounded, in the preferred embodiment, but not critically so. The posterior end 420 of the locking pin has a protruding knob 450 with a forward edge 458 that extends beyond the outer surface of such locking pin 300. Also in the preferred embodiment of the subject invention, the locking pin has a reduced diameter portion 455 just immediately forward of edge 458 of knob 450, and on the forward part of the reduced diameter portion of the locking pin 300 is an increased diameter section 453 which is viewed as being somewhat wedge-shaped as seen from the top elevational view of FIG. 5.

As seen in the top elevational sectional view of FIG. 3, the interior circumferential wall of the cap 320 has a radially outwardly formed wedge-shaped cut 410 just adjacent the edge 412 of opening 360.

Once the plate 40 is placed over the upper surface of the roof deck 20, and affixed thereto by nails, screws, etc., as seen in FIGS. 2 and 6, a portion of rubber roof sheet 10 is placed over the top edge of cup member 100. Once the rubber roof sheet is placed over the top of cup member 100, the cap-like member 320 is placed conformingly over the top of the rubber roof sheet 10 portion already placed over top of the cup-like member 100, as shown in FIG. 2. Once the cap-like member 320 is is pushed down over top of the cup-like member in the fully inserted downwardly position shown in FIG. 6, the forward end 306 of the locking pin 300 is inserted into the opening 360 in cap-like member 320 in a counterclockwise direction towards edge 412 of opening 360 as can be seen in FIG. 1. Thereafter, the locking pin 300 is thrust or pushed completely around the cup-like member 100 in such counterclockwise direction around the inner circumference of the cap-like member and around the outer circumferential surface of the cup-like member 100 in a positional relationship so that the locking pin fits conformingly and circumferentially in circumferential groove 220 in the cup-like member's outer circumferential wall, as specifically shown in FIG. 6. As the locking pin 300 is pushed circumferentially around the circumferential groove 220 the raised circumferential portion 453 can be locked into wedge-like opening 410 inside cap-like member and the knob 450 is locked at opening 360 by reason of its size relative to opening 360. Once the locking pin 300 is so emplaced, the cap-like structure 320 is rotated to further seat the locking pin 300 in the circumferential groove 320 and seat the rubber roof 10 firmly without tearing or damaging the rubber roof material.

In summary, the subject invention is a fastening plate apparatus for fastening a rubber roof sheet to the upper surface of a roof deck comprising a fastening plate member having an upper surface and a lower surface, such fastening plate having on its upper surface a cup-like member with an opening on the upper part leading to an internal cavity in such cup-like member, having an outer circumferential surface, with such fastening plate member having an opening extending from such cavity to the lower surface of such plate member, and wherein such cup-like member has a circumferentially extending groove on its outer circumferential surface, with cap-like means having an outer circumferential surface into which outer circumferential surfaces is formed an opening, and circumferentially extending fastening means adapted to be inserted into the opening in such cap member to lock rubber roof sheets against the fastening plate.

I claim:
1. A fastening plate apparatus for fastening a rubber roof sheet to the upper surface of a roof deck comprising:
  (a) a fastening plate member having an upper surface and a lower surface, said fastening plate having on its upper surface a cup-like member with an opening on the upper part leading to an internal cavity in said cup-like member, having an outer circumferential surface, with said fastening plate member having an opening extending from said cavity to the lower surface of said plate member, and wherein said cup-like member has a circumferentially extending groove on its outer circumferential surface;
  (b) cap-like means having an outer circumferential surface into which outer circumferential surface is formed an opening;
  (c) circumferentially extending fastening means adapted to be inserted into the opening in said cap-like member to lock rubber roof sheets against the fastening plate, wherein said fastening means is adapted to be circumferentially placed around the outer circumferential surface of the cup-like member and wherein said circumferentially extending fastening means has an enlarged end on the one end thereof relative to the rest of said circumferentially extending fastening means, said enlarged end to also be inserted through the opening.

2. A fastening plate apparatus for fastening a rubber roof sheet to the upper surface of a roof deck comprising:

(a) a fastening plate member having an upper surface and a lower surface, said fastening plate having on its upper surface a cup-like member with an opening on the upper part leading to an internal cavity in said cup-like member, having an outer circumferential surface, with said fastening plate member having an opening extending from said cavity to the lower surface of said plate member, and wherein said cup-like member has a circumferentially extending groove on its outer circumferential surface;

(b) cap-like means having an outer circumferential surface into which outer circumferential surface is formed an opening;

(c) circumferentially extending fastening means with a frontal end and a posterior end adapted to be inserted into the opening in said cap-like means to lock rubber roof sheets against the fastening plate said circumferentially extending fastening means having enlarged diameter means to its posterior end relative to the other portions of said fastening means.

* * * * *